POWDER COMPACTING PRESS

Original Filed Oct. 31, 1968 3 Sheets-Sheet 1

INVENTOR
JOSEPH E. SMITH

BY Hauke, Kraus, Gifford, & Pickels

ATTORNEYS

POWDER COMPACTING PRESS

Original Filed Oct. 31, 1968 3 Sheets-Sheet 2

INVENTOR
JOSEPH E. SMITH
BY Hauke, Kraus, Gifford & Patalidis
ATTORNEYS

POWDER COMPACTING PRESS

Original Filed Oct. 31, 1968 3 Sheets-Sheet 3

INVENTOR
JOSEPH E. SMITH
BY Hauke, Kraus, Gifford, & Patalidis
ATTORNEYS

United States Patent Office

Re. 27,562
Reissued Jan. 23, 1973

27,562
POWDER COMPACTING PRESS

Joseph E. Smith, Birmingham, Mich., assignor to Wolverine-Pentronix, Inc.

Original No. 3,561,054, dated Feb. 9, 1971, Ser. No. 772,291, Oct. 31, 1968. Application for reissue June 14, 1971, Ser. No. 153,004
Int. Cl. B30b *11/02, 15/32*
U.S. Cl. 425—78 26 Claims

Matter enclosed in heavy brackets [ ] appears in the original patent but forms no part of this reissue specification; matter printed in italics indicates the additions made by reissue.

ABSTRACT OF THE DISCLOSURE

A combined hopper and rotatable positioner assembly for a powder compacting press adapted to be pivotally positioned above a compression die provided with die cavities, the hopper being rotatable and provided with a base overlying said die, the base having alternating apertures, grooves and land sections in equal number corresponding to the number of die cavities and rotational drive means to rotate the hopper in timed sequence to alternately position the apertures, grooves and land sections over said die cavities.

REFERENCE TO RELATED APPLICATIONS

The present invention is in substance related to U.S. patent applications Ser. No. 450,27, filed Apr. 23, 1965 (now abandoned); Ser. No. 529,733 and 529,734, filed Feb. 24, 1966 (now U.S. Pats. Nos. 3,328,840 and 3,344,-213 respectively); Ser. No. 529,735, filed Feb. 24, 1966 (now abandoned); Ser. No. 529,842, filed Feb. 24, 1966 (now U.S. Pat. No. 3,328,842); Ser. No. 544,284, filed Apr. 21, 1966 (now U.S. Patent No. 3,365,540) and Ser. No. 618,230, filed Feb. 23, 1967 (now U.S. Pat. No. 3,415,142).

BACKGROUND OF THE INVENTION

The invention in the present application relates to a new and improved automatic powder compacting press or machine. The press is for the purpose of manufacturing cores or beads of ferrite or glass or any other powdered metal or comparable substance. The primary purpose of the machine is the manufacture of memory cores which are normally toroidal, pills, such as pharmaceutical pills, balls for ball point pens, porous bearings and bushings, and the like. Memory cores are of course widely used in computers and related apparatus. As stated, memory cores and porous bearings and bushings are normally toroidal, although pharmaceutical pills may be in the form of tablets, such as aspirin tablets, and balls for ball point pens are of course spherical.

Ferrite cores, by way of an example, may be from approximately .005 to .015 inch in thickness and the accuracy of the dimensions must be held to 1/10 of a thousandth of an inch. Ball for ball point pens may be in the same order of dimensions, and also require great accuracy in manufacturing. Pharmaceutical pills do not, of course, have to have comparaable accuracy. In the manufacture of the ferrite cores for use in memory devices, the density of the cores must also be held accurate thereby making it necessary that the fill or the amount of powder in each die cavity of a compacting press be maintained within very close limits. The resulting density of all cores must be the same, that is, it must be uniform and accordingly, the compressing of the powdered material must be exact and repetitively constant. If these dimensional and density factors are not held within close tolerances the readout level from the cores in a memory stack would not be substantially constant from core to core and the cores would not then serve their purpose. To realize the dimensional accuracy referred to in the foregoing, it is necessary that the press be capable of accurate adjustments of movements of certain parts within at least 50 millionths of an inch. The powder is compressed by way of punches which control the fill of the die cavities and the thickness to which the cores are compresed. In a machine according to the present invention the adjustment of the movements of these parts is accurate to within 50 to 100 millionths of an inch. One of the primary objects of the invention is consequently to make possible this degree of accuracy of the adjustments in a powder compacting press whereby the dimensions and density of the manufactured article is controllable with a great degree of accuracy.

A machine according to the present invention has many novel characteristics and advantages rendering it suitable for fulfilling many objectives in addition to the foregoing. An exemplary form of the machine of the invention which has been reduced to practice is capable of producing approximately eight hundred cores or pills per minute and its production rate can readily be increased to approximately sixteen hundred per minute. The machine referred to is fully automatic and discharges the finished units into separate vials or bottles. In the preferred exemplary form the machine is motor driven. The cores or pills are formed in a multi-cavity die. The cavities are automatically and accurately filled with powder; the powder is automatically pressed or compacted; the finished articles are automatically ejected from the die and are picked up, discharged and delivered into the vials or bottles.

In the preferred form of the machine, the punches move upwardly in the die cavities for compacting the powder. A novel flipper or positioner assembly is provided which is rotatably movable through a limited arc over the die and carries a base having an equal number of apertures, anvils and groove [section] *sections* which are alternately positionable over the die cavities. The positioner assembly also includes a powder hopper in the form of a tube which is constantly positioned over the die cavities for providing an overfill of powder in the cavities through the base apertures, the excess powder being retained in the hopper when the positioner is rotated or oscillated to another position, as will be explained hereinafter. Additionally, the novel positioner carries an air ejecting means for ejecting the finished article, i.e., cores, pills, or the like along the groove sections and through tubes into the separate bottles or vials referred to above, or, if preferred, into a common receptacle.

The primary object of the invention, consequently, is to provide a novel construction and mode of operation for the positioner of a powder compacting press for positioning the anvils, the hopper apertures and the air eject grooves of the positioner over the die cavities.

Further objects and additional advantages of the invention will become apparent from the following detailed description with reference to the accompanying drawings wherein:

DETAILED DESCRIPTION OF THE PREFERRED EMBODIMENT

General machine arrangement

Figure 4:
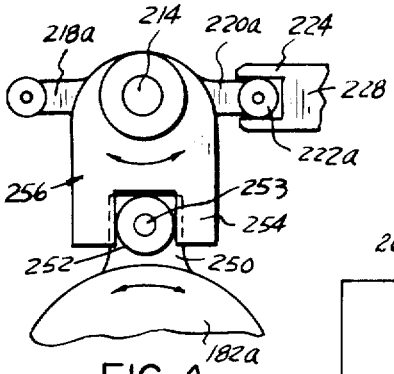
FIG. 4 is an alternate embodiment of the positioner oscillating mechanism of FIG. 1.
Figure 3:
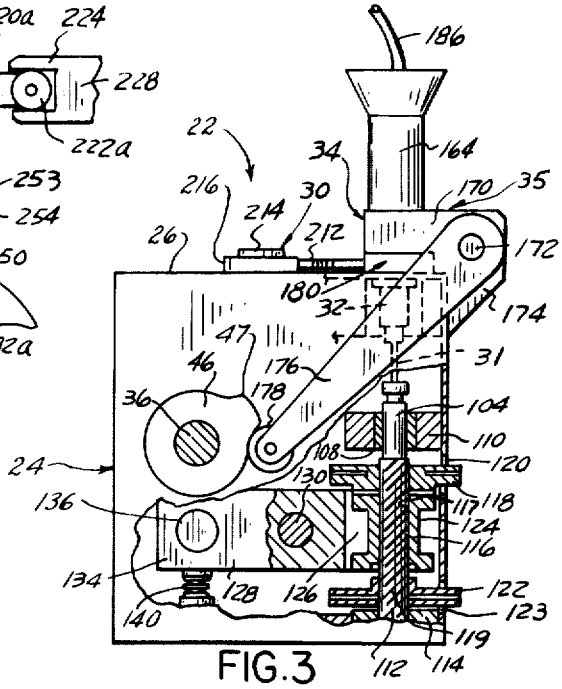
FIG. 3 is another side view of the present novel compacting press also having parts broken away for clarity to show the ram actuating mechanism[;] *as seen from line 3—3 of FIG. 2;*

With particular reference to FIGS. 1–3 and 6–9 a powder compacting press according to the present invention includes a base 20 upon which is mounted the press itself 22. The press 22 comprises a housing 24 which encloses most of the operating mechanism of the press and which has a work surface 26. The work surface comprises a table 28 (FIG. 9) [into] *on* which is mounted a positioner oscillating mechanism 30 and *below which is disposed* a die and punch tool capsule 32 [disposed below]. Mounted to the front of the table is a combined powder material hopper and positioner assembly 34, aligned with [an] *and* overlying the die and punch tool capsule 32, *and* which is adapted to be rotatably oriented into selective operating positions by the positioner oscillating mechanism 30 as will be described.

Figure 7:
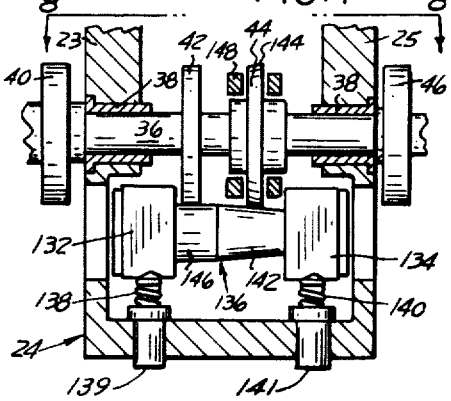
FIG. 7 is a cross-section through the cam and treadle mechanism in FIG. 6 along line 7—7 hereof.
Figure 8:
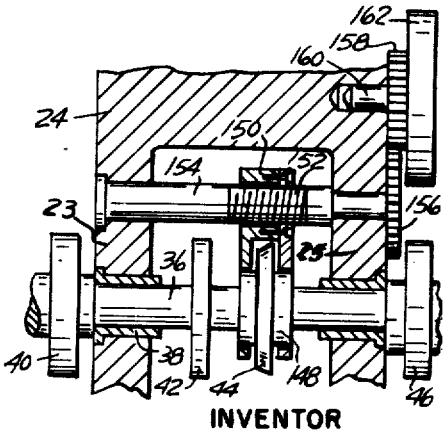
FIG. 8 is a longitudinal cross-section along the cam shaft of the mechanism in FIG.7[;] *as seen from line 8—8 of FIG. 7;*

A cam shaft 36, driven by an electric motor or the like, is mounted for rotation in bushings 38 disposed within opposite walls 23 and 25 of housing 24, as seen in FIGS. 7 and 8, and supports a number of control cams 40, 42, 44 and 46 for rotation therewith. The cam 40, which is adjacent to the housing wall 23, acts on the positioner oscillating mechanism 30 as will be explained and cam 46, which is adjacent to the other housing wall 25, acts on a clamp down assembly 35 for the positioner assembly 34, as will be likewise explained hereinafter in detail. The cams 42 and 44, which are positioned between the housing walls 23 and 25, are adapted to drive the punch actuating rod 31 of the die and punch tool capsule 32 in a manner to be explained hereinafter in detail.

Construction and operation of the die and punch tool capsule

Figure 9:
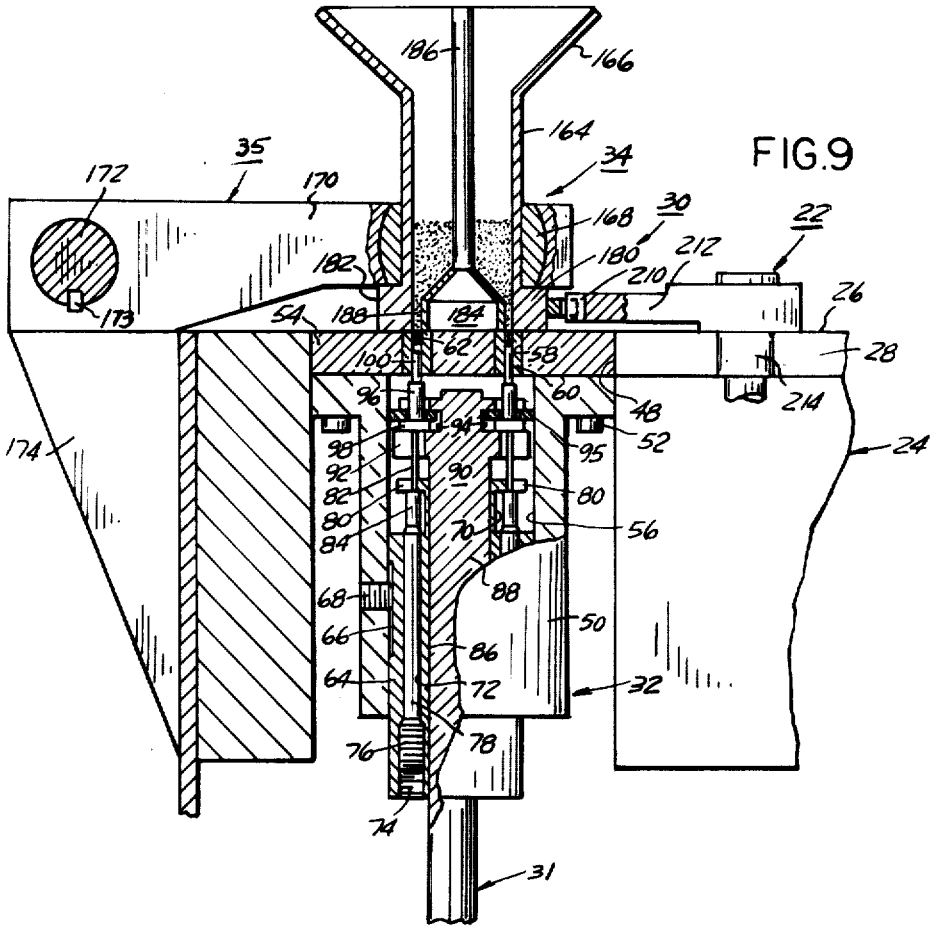
FIG. 9 is an enlarged vertical cross-section through the tool capsule and positioner assembly shown in the die cavity fill position.

The die and punch tool capsule 32 as illustrated in detailed cross-section in FIG. 9 may be of a structure as disclosed in the copending application Ser. No. 544,285, filed Apr. 21, 1966 (now U.S. Pat. No. 3,414,940), as shown in FIG. 9, or it may be of any of the structures disclosed in copending application Ser. No. 767,648, filed Oct. 15, 1968[.] (*now U.S. Patent No. 3,561,056*). The construction of the tool capsule is immaterial to the present invention and forms no part thereof. In the form shown in FIG. 9 for illustrative purposes, the die and tool capsule 32 is seated within an aperture 48 in the table 28 in which it is suitably secured by means such as screws, clamps or the like (not shown) and comprises a generally cylindrical housing 50 on top of which is attached as by screws 52, a die plate 54.

The die plate 54 has a flat upper surface preferably flush with the work surface 26 when in an assembled position, and the tool housing 50 is provided with a bore 56 disposed normal to the upper surface of the die plate 54. The die plate 54 is provided with one or a plurality of mutually parallel bores 58 preferably disposed in a circular arrangement around the axis of the housing bore 56 and having a regular peripheral spacing. Associated with each of the bores 58 is a die bushing 60 preferably formed of a hard material such as a carbide and which is press-fitted or otherwise secured within the bore 58. Each of the die bushings 60 is inserted in the bore 58 such that its upper end is flush with the upper surface of the die plate 54 and is provided with a longitudinal bore 62 which extends normally from the upper face of the die plate 54.

An elongated cylindrical sleeve member 64 is slidably disposed within the bore 56 of the tool housing 50. The cylindrical sleeve member 64 has formed on its outer surface a flattened surface 66 which is adapted to register with a set screw 68 carried by housing 50. Thus, it can be seen that the cylindrical sleeve member 64 may be adjusted [up and down] *longitudinally* within the bore 56 of the tool housing 50 and then locked in position.

Adjacent to the upper end of the cylindrical sleeve member 64 there is an annular slot 70 and a plurality of bores 72 extending longitudinally through the wall of the cylindrical sleeve member 64 from the annular slot 70 to terminate at the lower end with a threaded passage 74 which accommodates set screws 76. The bores 72 have an identical angular and radial disposition with respect to the axis of the sleeve member 64 as the bores 58 in the die plate 54 have with the housing bore 56, there being one bore 72 associated with each of the bores 58. It is to be understood that each of the set screws 76 is adapted to be adjusted upwardly and downwardly by an elongated tool (not shown) which may be inserted through the opening to the threaded passage 74 provided at the lower end of the sleeve member 64.

An elongated rod member 78 is provided for each of the bores 72 and is slidably disposed therein. The rods 78 have a length sufficient such that their upper ends will extend slightly into the annular slot 70 and extend downwardly through the bore 72, such that the lower end of the rod 78 will normally abut the upper end of the set screw 76. Thus, there will be in the case of an eight cavity die tool capsule eight similarly shaped rod members disposed within bores 72.

A plurality of regularly spaced radial slots 80 are formed inwardly from the upper end of the cylindrical sleeve member 64 with one slot 80 aligned with each of the bores 72. An upwardly extending elongated core rod 82 is associated with each of the radial slots 80 and has an enlarged lower end 4. The lower end 84 has a length which is slightly less than the axial length of the annular slot 70 so that the end 84 may be inserted radially into the slot with the core rod 82 registering in the radial slot 80.

The slots 80 are adapted so that each of the core rods 82 may be axially aligned with the die bushing bores 62. The core rods 82 have a diameter to accommodate the bore of a toroidally shaped article and have a length sufficient so that the upper ends thereof may be disposed flush with the upper surface of the die plate 54.

The cylindrical sleeve member 64 is provided with an axial bore 86 in which is slidably disposed an elongated punch actuating rod 88. The punch actuating rod 88 has an enlarged upper end 90 which is provided with a plurality of radial slots 92 corresponding to the die bushing bores 62. Thus, it can be seen that each of the [bore] *core* rods 82 extends upwardly through one of the radial slots 92 in the upper end of the punch actuating rod 88. An annular groove 94 is formed in the enlarged end 90 of the punch actuating rod and carries a plurality of cylindrical members 96 each of which having an enlarged lower end 98 which is seated in the groove 94 and locked therein by means of snap rings 95. Each of the cylindrical members 96 is provided with an axially extended elongated punch 100 which extends upwardly therefrom to register in a die bushing 60. The outer diameter of the punches 100 accurately [fit] *fits* the inner diameter 62 of the die bushings 60 while the inner diameter of the punches 100 closely fits around the core rods 82 which extend slidably through the punches for the punches to be guided thereon such that they are free for up and down movement.

The lower end of the punch actuating rod 88 is provided with a notched portion 102 and extends into [this] *the* upper portion 104 of a ramrod 112 to be secured therein by set screw 106 which engages the notch 102.

Again referring to FIGS. 2, 3 and 6–8 as mentioned above, the punch actuating rod 88 in the assembled portion is attached to the upper portion 104 of a ramrod 112 which is supported for axial sliding movement within a bushing 108 in a support 110 integral with or fastened to the housing 24. As seen in the FIGS. 2 and 3, the ramrod 112 extends downwardly in a substantially vertical direction towards the base 20 of the press to be slidably supported therein at its lower end within a bushing 114 in axial alignment with the upper support bushing 108. The ramrod 112 extends through an adjustable sleeve or spool member 116 which is mounted longitudinally adjustable along the ramrod 112 by being provided with a thread 117 on its internal bore engaging a thread 119 on the ramrod 112. An adjusting wheel 118 integral with the sleeve or spool member 116, part of which extends through an aperture 120 in the front housing wall, permits to adjust the relative longitudinal position of the ramrod 112 from the outside of the housing. Similarly, a lower adjusting wheel 122 is provided around the lower portion of the ramrod 112 in threading engagement therewith, which likewise extends through an opening 123 in the front housing wall to be adjustable from outside the housing for up and down movement along the ramrod 112 relative to the sleeve or spool member 116.

The upper adjusting sleeve or spool member 116 is provided with a central radial recess 124 adapted to receive a yoke portion 126 at the end of a lever or treadle 128[,] which is pivotally secured to a shaft 130 intermediate its ends within the housing 24. The other end of the lever 128 is bifurcated, as seen in FIG. 7, to provide opposite arms 132 and 134 which support therebetween a cam follower shaft 136 which is adapted to be engaged by the cam lobes of the intermediate cams 42 and 44 upon rotation of the camshaft 36 to pivot the elever 128 around the pivot shaft 130 to [offset movement of] *reciprocate* the ramrod 112. The arms 132 and 134 of the bifurcated end of the lever 128 are biased upwardly by means of springs 138 and 140 supported on wear pins 139 and 141 respectively in the bottom of the housing 24 so as to constantly tend to bias the lever upwardly around its pivot shaft 130 to keep the cam follower shaft 136 in contact with the rotatable cams 42 and 44. The cam follower shaft 136 has a tapered portion 142 adapted to be engaged by the cam 44 [upon rotation of] [cam] which has a [respectively inclined] *tapered* mating circumferential cam surface 144. The remaining portion 146 of the cam follower shaft 136 is of straight cylindrical shape and adapted to be engaged by the other cam 42 upon rotation of the cam. Upon operation cam 42 is adapted to initiate the eject cycle of the press and cam 44 is adapted to initiate the press cycle of the press.

In powder compacting presses of this kind it is desirable to regulate the compacted height and thus the density of the article to be made. For this reason, the press cam 44 is [being made] axially slidable on the cam shaft 36 to be adjustable along the tapered portion 142 of the cam follower shaft 136 by which means the horizontal position of the lever 128 can be angularly adjusted in minutes of degrees thereby raising or lowering the ramrod 112 and thus establishing the maximum amount that the punches 100 will extend into the die cavities 62 during the press cycle. With specific reference to FIG. 8, manual adjustment of the press cam 44 along the tapered portion 142 of the cam follower shaft 136 is accomplished by a yoke 148 engaging the cam 44. Yoke 148 has a body portion 150 which is internally threaded to be axially movably supported on a threaded portion 152 of a shaft 154 which is rotatably supported within housing 24. The external end of the shaft 154 is provided with a gear wheel 156 adapted to be in constant mesh with another gear wheel 158 rotatable on a stud 160 which is supported in the housing wall 25 of the housing 24 and which is provided with an adjusting wheel 162 outside of the housing 24 so that upon manipulation of the adjusting wheel 162, the shaft 154 will be rotated causing the body portion 150 of the yoke 148 to travel back or forth depending on *the* direction of rotation of the adjusting wheel 162 along the threaded portion 152 of the shaft 154 and thereby moving the cam 44 back or forth as desired along the tapered portion 142 of the cam follower shaft 136.

Construction and actuation of the novel positioner assembly

The present novel combined powdered material hopper and positioner assembly 34 on top of the press table 28 comprises a hopper 164 of substantially tubular construction having a flared entrance 166 at the top to facilitate the introduction of powdered material into the hopper. The hopper 164 is disposed in vertical position above the die and punch tool capsule 32 and in axial alignment with the tool capsule housing 50. The hopper 164 is supported at its lower end in a spherical bearing 168 for vertical self alignment in relation to the die plate 54. The spherical bearing 168 is supported within the end of a clamp arm 170 of the clamp down assembly 35 which extends towards the front of the machine to be pivotally secured on a shaft 172 by means of a key 173 (FIGS. 6–9). The shaft 172 is supported for rotation in bearings 175 in the upper portion of brackets 174 to both sides of the clamp arm 170 (FIG. 2) which are attached to the upper front of the housing 24. Attached to the outer end of the shaft 172 is a lever 176 extending angularly downwardly and rearwardly along the side of the housing 24 [which other] *and whose* end is provided with a cam follower roller 178 adapted to be in contact with the cam surface of a cam 46 which may be spring loaded thereagainst (not shown), as is common practice. Thus, upon rotation of the cam shaft 36 during the press cycle, the cam 46, in timed sequence, exerts a force on the lever 176 by means of its lobe portion 47 (FIG. 3) to pivot the lever 176 and thus rotate the shaft 172 by which the clamp arm 170 will be pressed downward upon the table 28 pressing the hopper 164 upon the die plate 54 in order to complete the compacting operation as will be explained in detail.

Figure 13:
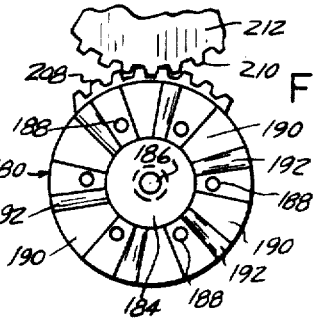
FIG. 13 is a bottom view of the hopper base plate and positioner oscillating mechanism[;] *as seen from line 13—13 of FIG. 10;*

The lower or base portion 180 of the hopper 164 abuts upon the die plate 54 and is provided with a circular flange 182 for abutment against the underside of the arm 170 by which the hopper 164 is retained upon the die plate 54. As illustrated in FIG. 13, the base 180 of the hopper which is circular in plan view is provided with a central upwardly receding cavity 184 which is in open communication with a conduit 186 extending centrally upwardly through the tubular hopper 164 and out of it to be connected to a source of pressurized air (not shown).

Figure 14:
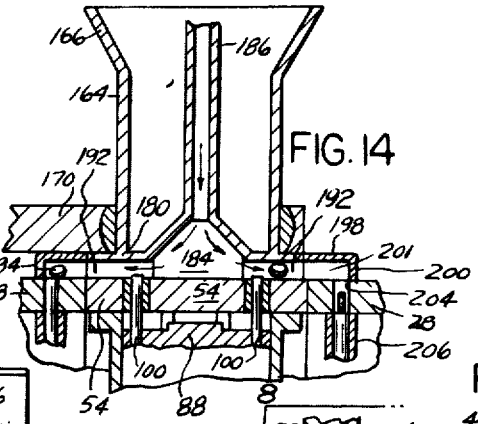
FIG. 14 is a schematic illustration similar to FIG. 12 showing an alternate ejecting tube construction.
Figure 10:
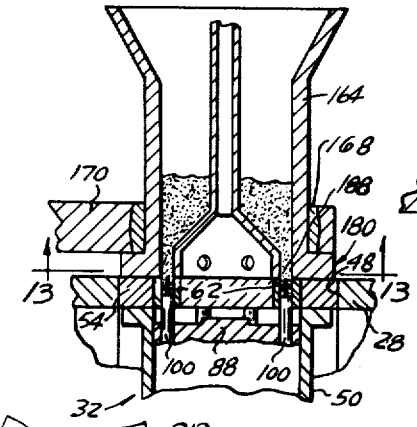
FIG. 10 is a schematic sectional view of the positioner assembly shown in the die cavity fill position.
Figure 11:
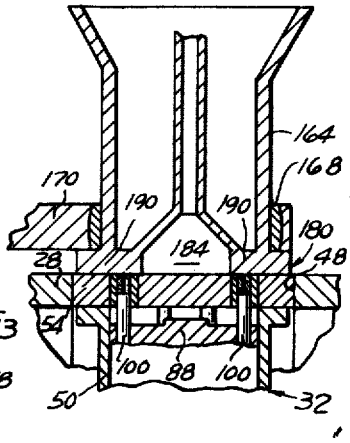
FIG. 11 is a schematic [setcional] *sectional* view of the positioner assembly shown in the press position.
Figure 12:
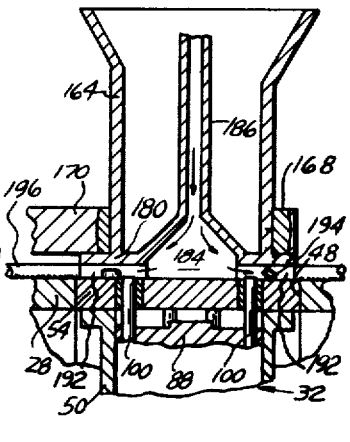
FIG. 12 is a schematic sectional view of the positioner assembly shown in the eject position.

The base 180 is further provided with vertical apertures 188 radially spaced around the central cavity 184 and which correspond in number with the number of die cavities on the die plate 54 and which communicate with the interior of the hopper 164 around the air conduit 186. When the hopper is placed in the "fill" position as shown in FIGS. 9 and 10, the apertures 188 in the base 180 register with the die cavities 62 to allow the powdered material contained in the hopper to fill the die cavities by gravity force. Adjacent to each of the apertures 188 the bottom side of the base 180 is provided with solid land portions or anvils 190 equal in number to the apertures 188 and of a width sufficient to completely cover the die cavities 62 when the hopper is placed in the "press" cycle, the hopper being pressed down upon the die plate 54 by means of the action of the cam 46 on the lever 176 as previously described and at a preselected magnitude of force to allow the powdered material within the die cavities 62 to be compressed between the anvils 190 and the upwardly advancing punches 100. The bottom side of the base 180 is further provided with radially outwardly extending grooves 192 between the apertures 188 and the land portions 190 which extend from the central aperture 184 to the outer edge of the base and which number is the same as that of the apertures 188 or anvils 190. These grooves 192 are provided for ejecting the finished articles from the machine in the following manner: When the hopper 164 is [placed in] *rotated to* the "eject" position as shown in FIG. 12, the grooves 192 register with the die cavities 62 and after the finished articles 194 have been pushed out of the cavities 62 by the complete advancement of the punches 100 by means of force exerted by the press cam 42 on the treadle 128 a blast of air is expelled through the conduit 186 within the tubular hopper into the central cavity 184 which causes the air to move the finished articles 194 through the grooves 192 out of the hopper base 180 and into separate tubes 196 provided around the hopper base on the work table 28 in registering relationship with the grooves 192 when the hopper is in the position illustrated in FIG. 12. The tubes 196 may empty into separate containers (not shown) to separately collect the finished articles from each die cavity. FIG. 14 illustrates an alternate embodiment of separately collecting the finished articles 194 which provides in this instance a shield *or shroud* 198 having [a] [radial] *an annular* flange 200 which extends around the base portion 180 of the hopper 164 to be suitably secured thereto. The work table 28, in this instance, is provided with apertures 204 spaced around the base 180 which open into the space 201 between the shield flange 200 and the radial edge of the flange 182 of the base 180. The apertures 204 are connected to conduits 206 extending underneath the work table 28 to convey the finished articles into separate containers (not shown). Thus, during the "eject" cycle when air is forced through the conduit 186 the finished articles are blown out of the base 180 into the space 201 and against the flange 200 where they are caused to fall through the apertures 204 into the discharge conduits 206.

Instead of separating the articles 134 they may be ejected through the grooves 192 into a common receptacle (not shown) by brushing them off the surface of the worktable 28 or any similar method.

Figure 15:
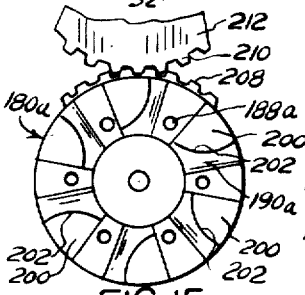
FIG. 15 is a view similar to FIG. 13 illustrating an alternate construction of the hopper base plate.
Figure 16:
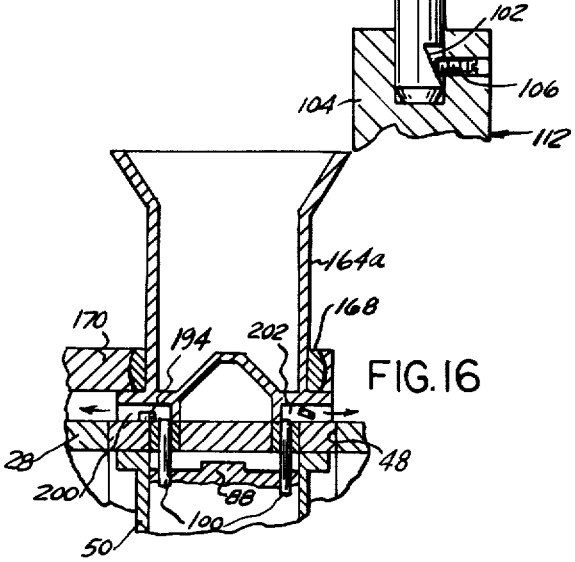
FIG. 16 is a cross-section through a modified positioner assembly in accordance with the modified hopper base plate shown in FIG. 15.

With reference to FIGS. 15 and 16 there is illustrated an alternate hopper construction 164a in which the air conduit 186 has been omitted. In this embodiment the finished article 194 is being ejected from the revised hopper base 180a by mechanical means. As illustrated, the [former] eject grooves [192 have been replaced by a] *are in the form of* cam [groove] *grooves* 200 which [is] *are each* formed adjacent [the] *an* anvil [portions] *portion* 190a by a curved cam surface 202 which extends from the portion of the base in which [the] *each* feed [apertures] *aperture* 188a [are] *is* located along a curved path outwardly to the edge of the base where the cam surface joins the anvil portion 190a.

After the finished articles 194 have been ejected into the cam grooves 200 as shown in FIG. 16, the return rotation of the hopper 164a to the *powder* material feeding position causes the finished articles 194 to be moved along the curved cam surface 202 across the die plate 54 and finally out of the hopper base 180a. The articles 194 then are [scoped] *scooped* off the worktable 28 by any known suitable means for collection into a container.

The mechanical removal of the finished articles 194 from the hopper base as illustrated in FIGS. 15 and 16 greatly facilitates the installation requirements and operational cost for the press by the omission of the fluid pressure arrangement used in the embodiments of FIGS. 10 through 14.

The positioner assembly 34, that is, the hopper 164, is *rotatably* oscillated in a timed sequence to be positioned for the different work cycles by the following positioner oscillating mechanism 30. With specific reference to FIGS. 1, 5 and 13, one section of the radial flange 182 of the hopper base 180 opposite of the clamp down assembly 35, is provided with teeth 208 adapted to be in meshing engagement with the teeth 210 of a semicircular oscillating rack 212 which is rearwardly pivoted on the worktable 28 on a shaft 214 which is rotatably supported in a bearing 216. The teeth 208 may be provided on other portions of the hopper 164 as required, for instance, when necessary to clear the ejection tubes 196 in FIG. 12 or shield 198 in FIG. 14. The oscillating rack 212 is provided with transverse extensions or ears 218 and 220 which each carry a roller 222 at their end rotatably supported on pins 223.

Figure 5:
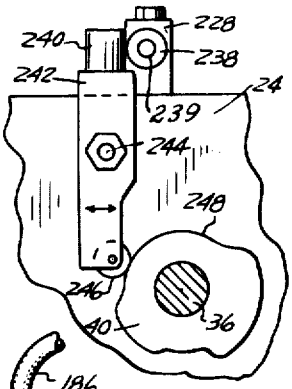
FIG. 5 is a separate partial view of the cam and lever assembly for actuating the positioner oscillating mechanism shown in FIG. 1 [;] *as seen from line 5—5 of*
Figure 1:
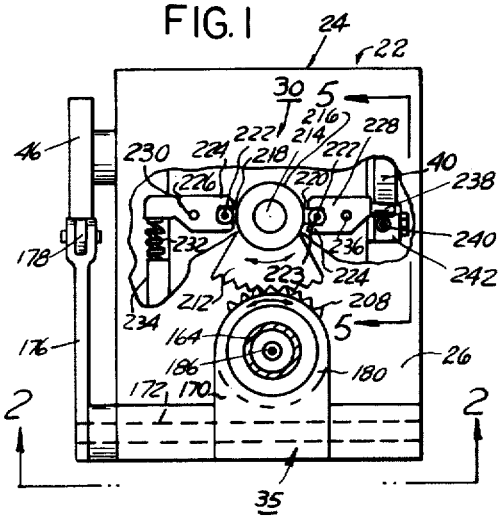
FIG. 1 is an upper plan view of a preferred embodiment of the invention, with parts broken away for clarity, to show the positioner oscillating mechanism.
Figure 2:
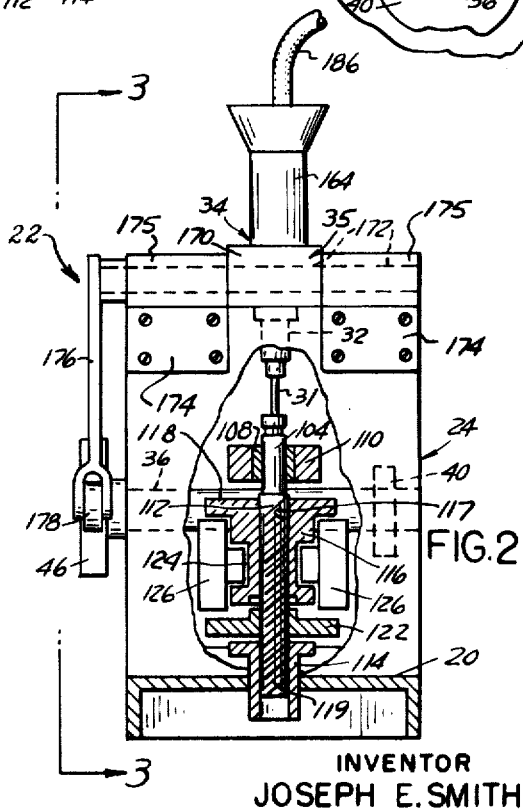
FIG. 2 is a side elevational view of the invention likewise having parts broken away for clarity to show the press ram and ram adjustment mechanism[;] *as seen from line 2—2 of FIG. 1;*
Figure 6:
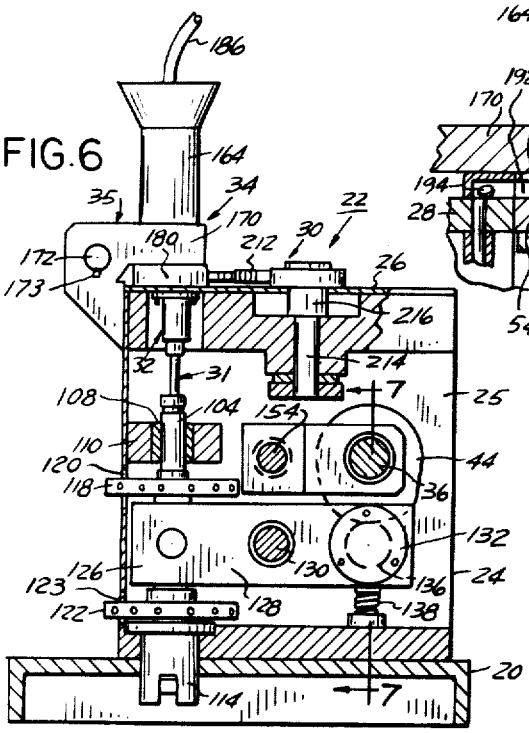
FIG. 6 is a vertical cross-section through the novel compacting press embodying the present invention.

The rollers 222 at the rack ears 218 and 220 are engaged by the forked ends 224 of a pair of oppositely disposed levers 226 and 228 respectively. The left hand lever 226, as shown in FIG. 1, is pivoted between its ends, as shown at 230, *relative* to the worktable 28 and its free end is biased in one direction by means of a spring 232 which is horizontally supported against an abutment 234 integral with the housing 24. Thus, the force of the spring tends to rotate the lever 226 and thus tends to rotate the oscillating rack 212 by its connection with the ear 218. The opposite lever 228 is likewise pivoted at 236 between its ends and its free end is provided with a roller 238 supported on a pin 239 and adapted to be in engaged rolling contact with another roller 240 positioned transverse to the axis of the roller 238. With reference to FIG. 5, the roller 240 is rotatably supported on the end of a pivot link 242 which is pivoted intermediate its ends at 244 *relative* to an internal portion of the housing 24 and whose other end carries a cam follower roller 246 which is adapted to be in engaged rolling contact with the contoured radial surface 248 of the cam 40 positioned on cam shaft 36 for rotation therewith. The spring 232 at one end of the lever 226 causes a biasing action on the lever 226 which tends to keep the cam follower roller 246 in constant engagement with the cam 40. Upon rotation of the cam 40, the lobe section of the cam by its contact with the cam follower roller 246 swings the pivot link 242 against the end of the lever 228 which is thus pivoted to thereby rotate the oscillating rack 212 in one direction causing angularly limited rotation of the hopper 164 to the required work position, due to the meshing of the teeth 210 on the oscillating rack and teeth 208 on the hopper flange 182. Rotation of the oscillating rack in this direction causes compression of the spring 232 since the lever 226 is forced to pivot in a direction opposite from the pivoting movement of lever 228. Upon further rotation of the cam 40 the pivot link 242 will swing away from the lever 228 due to the lobed cam surface, in which instance the spring 232 at the opposite end expands and swings the level 226 around, thereby rotating the oscillating rack 212 in the other direction and thus rotating the hopper 164 in the opposite direction [for] *to* another work position.

Rotation of the oscillating rack 212 in this direction by the force of the spring 232 causes the lever 228 to be swung around in the other direction to bring the roller 238 again into contact with the roller 240 on the pivoting link 242 to swing the link 242 around to maintain force transmitting contact between the cam follower roller 246 and the cam 40.

FIG. 4 illustrates an alternate embodiment for positioning the hopper 164 which eliminates the rack arrangement of FIG. 1. The hopper flange 182a, in this instance, is equipped with an extension or ear 250 which carries a roller 252 rotatable on a pin 253 and which is adapted to be engaged by an oscillating member 256 which replaces the oscillating rack 212 of FIG. 1. The oscillating member 256 is likewise provided with ears 218a and 220a having rollers 222a mounted on pins 223a which are engaged by the forked ends 224 of the levers 226 or 228 respectively. The remaining portion of the mechanism is the same as that described in connection with FIG. 1. It can be seen that upon rotation of the cam 40 the oscillating member 256 in FIG. 4 will be angularly rotated in either direction as indicated by the arrow in the manner described in connection with FIG. 1 and thus rotatively positions the hopper 164 due to its forked end connection with the roller 252 on the hopper flange 182a.

As mentioned in the preamble of the specification, to obtain precision articles, the different work cycles of the machine must be accurately adjusted prior to operation of the machine. Thus, the initial "fill" position of the punches and the extent of the punches during the pressing stroke and eject stroke can be accurately adjusted to any desired degree by means of the adjusting wheels 118 and 122 which [sets] *set* the limits for the up and down movement of the ram and by the adjusting wheel 162 which moves the press cam 44 along the tapered cam follower shaft 142 to thus establish the initial position of the ram lever 128 for a desired thickness of the article.

Operation of the press

After the initial adjustments have been made, as described above, the press motor (not shown) is started to rotate the cam shaft 36 and the cam 40 by its rotation acts as explained above to position the hopper 164 in the "fill" position illustrated in FIGS. 9 and 10 allowing powdered material to enter the die cavities 62 through the apertures 188 in the hopper base 180. Thereafter, again by rotation of the cam 40, the hopper 164 is further rotated to the "press" position shown in FIG. 11 to bring the anvil portions 190 over the filled die cavities 62. At that time the lobes of the clamping cam 46 act on the lever 176 to clamp the hopper 146 down upon the die plate 54. Thereafter, the lobes of the press cam 44 depress the ram lever 128 by force on the cam follower shaft 136 to move the punches 100 upwards in the die cavities towards the anvil portions 190 to then compress the powdered material in the die cavities. Hereafter, by further rotation of the cam 40 the hopper 164 is rotated to the "eject" position shown in FIG. 12 or 14 and downward pressure on the hopper is relieved by the further rotation of the cam 46, releasing the lever 176. At this time the rotation of the eject cam 42 causes the cam lobe to further depress the ram lever 128 by its force on the cam follower shaft 136 to completely advance the punches 100 through the die cavities 62 to eject the finished compressed articles 194 from the cavities into the grooves 192 in the hopper base from where the articles will be expelled by a blast of air through conduit 186 which is operated by a timed valve mechanism (not shown) to force the articles into the discharge tubes 196 as in FIG. 12 or tubes 206 as in FIG. 14. The hopper 164 is then reversely rotated to its initial "fill" position and the punches 100 likewise recede in the die cavities 62 to assume their initial position as in FIG. 10 whereafter the foregoing cycle is repeated.

CONCLUSION

Thus, the present invention provides an improved combined *powder* material hopper *for a compacting press* and multiple station positioning means eliminating the need for a separate hopper and station positioner as in the prior art presses.

The base plate of the hopper, which could be made to be detachable from the hopper to facilitate a changeover from one multiple cavity die set to another, is of a unique construction to unilaterally fulfill the diverse work cycle requirements such as filling the cavities, compression and [rejection] *ejection of the finished articles* by simply rotating the hopper in the desired direction.

More sophisticated variations of the present novel powder compacting press mechanism will carry punches in the press section which will enable the compacting of balls and other curved or spherical parts instead of the flat, cylindrical, tablet-like parts herein shown for illustration.

The present invention may be embodied in other forms without departing from the spirit and essential characteristics thereof. Therefore, the present embodiments are to be considered as illustrative only and not restrictive, the scope of the invention being indicated by the appended claims rather than by the foregoing description.

What I claim is:

1. In an apparatus for making articles compacted from powder comprising a die having at least one cavity therein, means for filling the die cavity with a powder to be compacted, punch means disposed below said die cavity and longitudinally movable therein, actuating means for moving said punch means to a first position causing filling of said cavity, anvil means movable over said die cavity and adapted to close said cavity, actuating means for moving said punch means to a second position for compacting the powder to a finished article against said anvil means, means replacing said anvil means over said cavity by ejecting means, and actuating means for moving said punch means to a third position ejecting said finished article from said cavity, the improvement comprising a cylindrical hollow member disposed above said die and angularly positionable around a vertical axis, said hollow member having an integral annular base engaging said die, the interior of said hollow member being adapted to contain said powder, a longitudinal aperture in said annular base in communication with the interior of said hollow member for filling said die cavity with said powder in a first angular position of said hollow member, a flat portion in said annular base defining said anvil means when disposed over said die cavity in a second angular position of said hollow member, and means in said annular base disposed over said die cavity for ejecting said finished article in a third angular position of said hollow member to the exterior of said hollow member.

2. The improvement of claim 1 wherein said means for ejecting said finished articles comprises *an* outwardly open radial [grooves] *groove* [each of which is defined by a curved cam] [surface and an opposite straight surface.]

3. The improvement of claim [1] *2* wherein said [means for] [ejecting said finished articles comprise] radial [grooves] *groove is* defined by straight surfaces.

[4.] *5.* The improvement of claim [3] *2* further comprising means for delivering a blast of fluid through said radial groove for ejecting said finished article from said radial groove.

[5.] *6.* The improvement of claim [1] *2* further comprising an annular shroud member disposed around the annular base of said cylindrical hollow member for collecting the finished articles ejected from said groove.

[6.] *7.* The improvement of claim [5] *6* wherein said die has a plurality of die cavities and the annular base of said cylindrical hollow member has a groove for each die cavity and said annular shroud has a plurality of discharge passageways each registering with each groove [of said shroud] for ejecting each of said finish articles through a separate path.

[7.] *8.* The improvement of claim 1 further comprising means firmly holding the annular base of said hollow member in engagement with said die while said hollow member is at said second angular position.

[8.] *9.* The improvement of claim 1 wherein said hollow member has a toothed sector portion on the periphery thereof engaged with a toothed sector member and *comprising* means to rotate said toothed sector member for angularly positioning said hollow member.

[9.] *10.* The improvement of claim 1 wherein said hollow member has a projecting arm extension provided with a roller[,] *and comprising* a forked arm member in engagement with said roller and means to rotate said forked arm member for angularly positioning said hollow member.

[10.] *11.* The improvement of claim 1 wherein said hollow member has a central wall portion disposed near the bottom thereof for separating said hollow member into an outer chamber containing said powder and communicating with said longitudinal aperture, said inner chamber communicating with said radial groove and means for intermittently placing said inner chamber in communication with a source of compressed air when said hollow member occupies said third angular position.

[11.] *12.* The improvement of claim 1 wherein the means for actuating said punch means comprises a reciprocable punch actuating rod having an end supporting said punch *means* and another end attached to a ram provided with a sleeve member, *and comprising* a treadle lever having a yoke *on one end* for engagement with said sleeve member, a cam follower on the other end of said treadle lever, said cam follower having a cylindrical straight portion and a tapered portion, a cam shaft having a plurality of cams thereon and means for driving said cam shaft, a press cam on said cam shaft having a lobe adapted to engage the tapered portion of said cam follower for reciprocating said actuating rod to said second position for compacting the powder, an eject cam on said cam shaft having a lobe adapted to engage the cylindrical portion of said cam follower for reciprocating said actuating rod to said third position for ejecting said finished article from said cavity, and biasing means urging said punch actuating rod to said first position for filling said cavity when the lobes of said press and eject cams are not engaged with said cam follower.

[12.] *13.* The improvement of claim [11] *12* wherein said sleeve member is longitudinally adjustable relatively to said punch actuating rod.

[13.] *14.* The improvement of claim [11] *12* further comprising adjustable abutment means limiting the amount of travel of said punch actuating rod to said first position.

[14.] *15.* The improvement of claim [11] *12* further comprising a yoke member having a bifurcated end laterally engaging said press cam, and means manually adjusting the longitudinal position of said press cam along said cam shaft by moving said yoke parallel to said cam shaft.

[15.] *16.* In an apparatus for making articles compacted from powder comprising a die having at least one cavity therein, means for filling the die cavity with a powder to be compacted, punch means disposed below said die cavity and longitudinally movable therein, actuating means for moving said punch means to a first position causing filling of said cavity, anvil means movable over said die cavity and adapted to close said cavity, actuating means for moving said punch means to a second position for compacting the powder to a finished article against said anvil means, means replacing said anvil means over said cavity by ejecting means, and actuating means for moving said punch means to a third position ejecting said finished article from said cavity, the improvement comprising a cylindrical hollow member disposed above said die and angularly positionable around a vertical axis, said hollow member having an integral annular base engaging said die, a central wall disposed in said hollow member near said base and defining in the interior of said hollow member an outer chamber adapted to contain said powder and an inner chamber, a source of compressed air, a longitudinal aperture in said annular base in communication with said outer chamber for filling said die cavity with said powder in a first angular position of said hollow member, a flat portion on said annular base defining said anvil means when disposed over said die cavity in a second angular position of said hollow member, a radial groove in said annular base disposed over said die cavity in a third angular position of said hollow member, said radial groove being in communication with said inner chamber, and means for placing said inner chamber in communication with said source of compressed air for ejecting said finished article from said groove to the exterior of said hollow member.

[16.] *17.* The improvement of claim [15] *16* further comprising an annular shroud member disposed around the annular base of said cylindrical hollow member for collecting the finished articles ejected from said groove.

[17.] *18.* The improvement of claim [16] *17* wherein said die has a plurality of die cavities and the annular base of said cylindrical hollow member has a groove for each die cavity and said annular shroud has a plurality of discharge passageways each registering with each [groove of said shroud] *of said grooves* for ejecting each of said finished articles through a separate path.

[18.] *19.* The improvement of claim [15] *16* further comprising means firmly holding the annular base of said hollow member in engagement with said die while said hollow member is at said second angular position.

[19.] *20.* The improvement of claim [18] *19* wherein said last mentioned means comprises a horizontal shaft supported for limited rotation along a side of said apparatus proximate said die, a horizontally projecting arm having an end secured to said shaft and another end supporting said hollow member, a lever having an end secured to said shaft and another end engaging the periphery of a cam, and lobe means in said cam for causing said lever to urge said shaft in a direction that causes said horizontally projecting arm to apply pressure to the annular base of said hollow member to hold said hollow member in firm engagement with said die while said hollow member is in said second angular position.

[20.] *21.* The improvement of claim [15] *16* wherein said hollow member has a toothed sector portion on the periphery thereof engaged with a toothed sector member and *comprising* means to rotate said toothed sector member for angularly positioning said hollow member.

[21.] *22.* The improvement of claim [15] *16* wherein said hollow member has a projecting arm extension provided with a roller, a forked arm member in engagement with said roller and means to rotate said forked arm member for angularly positioning said hollow member.

[22. The improvement of claim 15 wherein said hollow member has a central wall portion disposed near the bottom thereof for separating said hollow member into an outer chamber and an inner chamber, said outer chamber containing said powder and communicating with said longitudinal aperture, said inner chamber communicating with said radial groove and means for intermittently placing said inner chamber in communication with a source of compressed air when said hollow member occupies said third angular position.]

23. The improvement of claim [15] *16* wherein the means for actuating said punch means comprises a reciprocable punch actuating rod having an end supporting said punch *means* and another end attached to a ram provided with a sleeve member, a treadle lever having a yoke for engagement with said sleeve member, a cam follower on the other end of said treadle lever, said cam follower having a cylindrical straight portion and a tapered portion, a cam shaft having a plurality of cams thereon and means for driving said cam shaft, a press cam on said cam shaft having a lobe adapted to engage the tapered portion of said cam follower for reciprocating said punch actuating rod to said second position for compacting the powder, an eject cam on said cam shaft having a lobe adapted to engage the cylindrical portion of said cam follower for reciprocating said punch actuating rod to said third position for ejecting said finished article from said cavity, and biasing means urging said punch actuating rod to said first position for filling said cavity when the lobes of said press and eject cams are not engaged with said cam follower.

24. The improvement of claim [15] *23* wherein said sleeve member is longitudinally adjustable relatively to said punch actuating rod.

25. The improvement of claim [15] *23* further comprising adjustable abutment means limiting the amount of travel of said punch actuating rod to said first position.

26. The improvement of claim [15] *23* further comprising a yoke member having a bifurcated end laterally engaging said press cam, and means manually adjusting the longitudinal position of said press cam along said cam shaft by moving said yoke parallel to said cam shaft.

*27. The improvement of claim 2 wherein said radial groove is defined by a curved cam surface and an opposite straight surface.*

References Cited

The following references, cited by the Examiner, are of record in the patented file of this patent or the original patent.

UNITED STATES PATENTS

| | | | |
|---|---|---|---|
| 3,128,499 | 4/1964 | Smolenski | 425—225 |
| 3,328,840 | 7/1967 | Vinson | 425—351 |
| 3,382,540 | 5/1968 | Van De Maden et al. | 425—414 |
| 3,414,940 | 12/1968 | Vinson | 425—195 |
| 3,469,283 | 9/1969 | Vinson | 425—78 |
| 2,362,048 | 11/1944 | Cherry et al. | |

J. HOWARD FLINT, JR., Primary Examiner

U.S. Cl. X.R.

425—168, 437, 444, 455

UNITED STATES PATENT OFFICE

CERTIFICATE OF CORRECTION

Reissue Patent No. 27,562 Reissued ~~XXXXX~~ January 23, 1973

Inventor(s) JOSEPH E. SMITH

It is certified that error appears in the above-identified patent and that said Letters Patent are hereby corrected as shown below:

IN THE SPECIFICATION

Column 1, line 31, change "450,27" to - - 450,427 - - line 59, before "for" change "Ball" to - Balls - line 62, correct the spelling of "comparable"

Column 3, at the end of line 5, insert -- FIG. 1; - -

Column 4, line 61, change "4" to - - 84 - -

Column 5, line 56, correct the spelling of "lever"

Column 6, line 34, after "top" change "to" to

- - [of] to - - line 45, after "shaft" change "172" to

- - [174] 172 - - line 46, after "brackets" change "174"

to - - [172] 174 - -

Column 8, line 16, after "35" delete "[,]"

Signed and sealed this 29th day of May 1973.

(SEAL)
Attest:

EDWARD M.FLETCHER,JR.
Attesting Officer

ROBERT GOTTSCHALK
Commissioner of Patents